Figure 1:
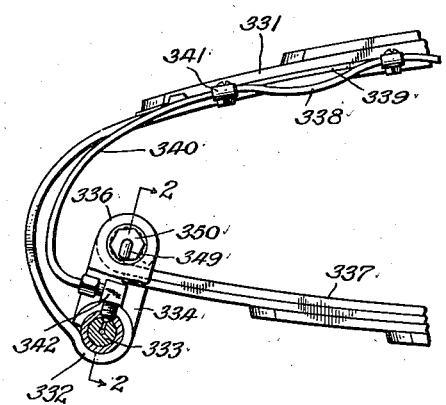

Jan. 19, 1937.  J. BIJUR  2,067,898

LUBRICATION

Original Filed March 27, 1923

Inventor:
Joseph Bijur, deceased,
by George Bijur, Executor.

Patented Jan. 19, 1937

2,067,898

UNITED STATES PATENT OFFICE 2,067,898

LUBRICATION

Joseph Bijur, deceased, late of New York, N. Y., by George Bijur, executor, New York, N. Y., assignor to Auto Research Corporation, a corporation of Delaware Original application March 27, 1923, Serial No. 627,953, now Patent No. 1,845,826, dated February 6, 1932. Divided and this application January 27, 1932, Serial No. 589,286. In Great Britain July 25, 1924

6 Claims. (Cl. 184—7)

The present invention relates primarily to installations for transmitting fluid or fluid pressure between a machine frame and a part movable relative thereto, and may be more fully understood from the accompanying drawing, in which are shown some of various possible embodiments of the several features of the invention.

Figure 2:
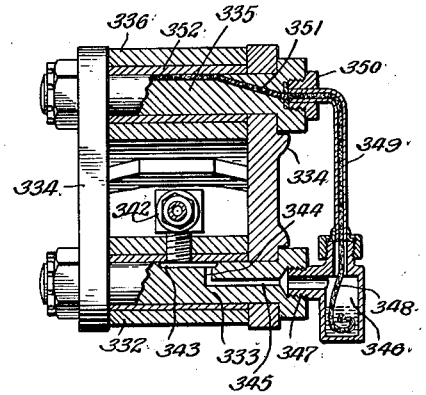
Figure 3:
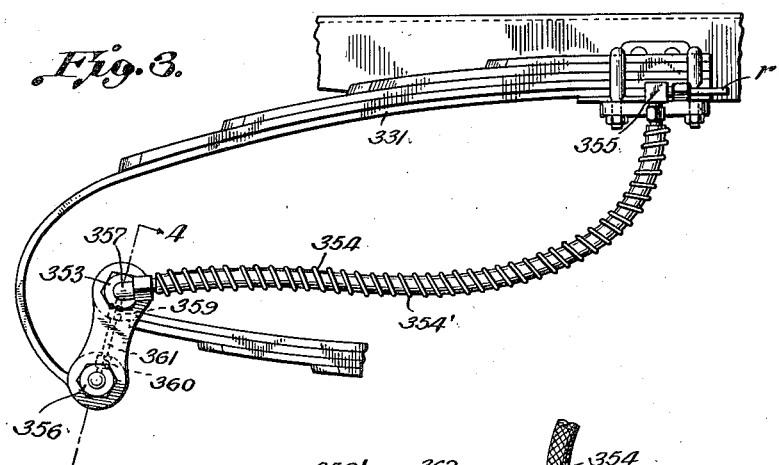
Figure 4:
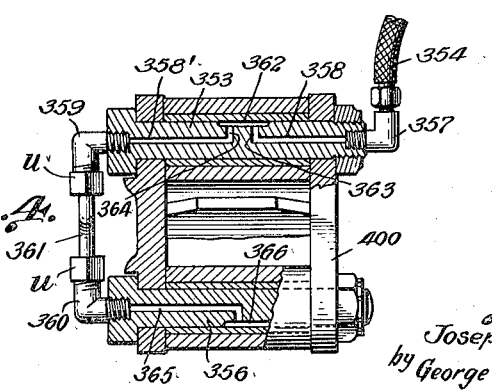

In the drawing,

Fig. 1 is fragmentary side elevation, illustrating the lubrication of the shackle link in a three quarter elliptic spring type of construction, Fig. 2 is a view on an enlarged scale taken along the line 2—2 of Fig. 1, Fig. 3 is a view similar to Fig. 1 of a modification thereof, Fig. 4 is a sectional view taken along the line 4—4 of Fig. 3.

Similar reference characters refer to similar parts throughout the several views of the drawing.

In Figs. 1 to 4 are shown alternative embodiments of peculiar utility in connection with vehicles having springs of the three-quarter elliptic type. In this type of construction, it will be noted, there is a quarter elliptic spring element 331 with an eye 332 at its lower end for sustaining the lower bolt 333 of a spring shackle 334 about the upper bolt 335 of which the eye 336, of the usual semi-elliptic spring 337, is coiled. It will be seen that the weight of the vehicle frame places the shackle links 334 under tension, and that both ends of the shackle link may partake of displacement relative to the fixed portion of the chassis during spring flexure.

Lubrication may be effected through a conduit 338 extending along an interleaf 339 formed on the upper or chassis portion 331 of the spring and connecting through a curved run 340 from the extreme clip 341, through a drip fitting 342 threaded through the spring eye 332 and communicating with bolt 333.

The upper or spring bolt 335 may be lubricated from the lower bolt by the construction shown in detail in Fig. 2. The fitting 342 here communicates with a well 343 in bolt 333, which well, in turn, communicates near an end thereof with a radial duct 344, merging into a longitudinal duct 345, which supplies an oil reservoir or cup 346 threaded as at 347 into the extreme end of bolt 333. A wick 348 dips into the reservoir 346 and extends upward through a protective tube 349 connected as by a gland 350 into the upper bolt 335. The wick continues through a corresponding groove 351, through bolt 335, and contacts spring bushing 352 at the upper side thereof, whence the lubricant drops freely from the wick for effective lubrication. The usual lugs 334' or their equivalent prevent relative movement of the bolts and links, so that the lubricant is delivered, in the drawing, to the unloaded or loose side of bolts 333 and 335, which is thus retained at all times substantially uppermost as shown. By this construction, it will be seen that the lower bearing 333 of the shackle receives a liberal supply of lubricant collected in the well 343 and the overflow therefrom through the duct 344 is stored in the cup 346 and is supplied by capillary action to the wick 348 for lubricating the upper bolt 335.

In the alternative construction shown in Fig. 3, the lubricant is supplied from the channel frame to the upper bolt 353 of the spring, through a suitable hose 354 which may be of rubber or canvas and which may have wire 354' coiled thereabout for protection. The hose is connected to the main $r$ by a drip fitting 355 of the type described in the copending application, Serial No. 580,668, now Patent No. 1,975,920. The drip plug, it is seen, substantially absorbs the pressure by which the oil is forced therethrough, so that the oil delivered therefrom to the shackle flows by gravity through the length of conduit 354 without exerting pressure on the wall thereof. Accordingly, if hose of relatively perishable character is employed, and should develop a leak, the system woud not be disabled pending replacement, the oil from the line not being forced through the leak, as the drip plug prevents the transmission of the line pressure to the hose 354.

The overflow in Fig. 3 from the upper bolt 353 supplies the lower bolt 356 by gravity flow and may be effected by the specific construction shown in Fig. 4. In this case, the flexible hose 354 is connected through an L fitting 357 at the extremity of the upper bolt 353, and supplies a well 362 in the surface of said bolt and between the ends thereof, through a longitudinal duct 358 from the corresponding end of the bolt. A longitudinal duct 358' to the opposite end of the bolt is supplied by flow from well 362 and is connected by an exterior connecting duct with the center or axis of the lower bolt 356. The connecting duct may comprise a pair of L fittings 359 and 360 respectively fitted into the upper and lower bolts 353 and 356, which communicate through a short length of pipe 361, preferably curved and connected in place by unions *u*. Fitting 360 delivers to an axial duct 365 in the lower bolt to supply a well 366 for lubricating the lower bearing as is clearly shown. Ducts 358 and 358' communicate with well 362 at separated points 363 and 364, as shown, so that a sufficient supply of lubricant will collect in the well to satisfactorily lubricate the upper bearing, the remainder of the oil flowing through duct 358' to the lower bearing. Shackle 400 being under tension, the upper bolt is unloaded at its upper half and the lower bolt at its lower, and, as shown in the drawing, the wells are preferably disposed at said unloading parts to facilitate lubrication, and to avoid disposing the well edge at the loaded side, where it may cause wear on the bushing.

It is apparent that the lubricating system shown in the present application may be broadly applied to the lubrication of other mechanisms, without restriction to chassis bearings, and that the system shown has a broad field of adaptation to lubricating various types of machinery in which there is relative movement between the various parts requiring lubrication.

It is to be understood that the various constructions shown in Figs. 1 to 4 may be interchangeably utilized in various constructions and that the system shown in these figures may be utilized either with a centralized lubricating system or with a localized lubricating system.

The present application is a division of copending application Serial No. 627,953, filed March 27, 1923, now Patent No. 1,845,826.

As many changes could be made in the above construction, and many apparently widely different embodiments of this invention could be devised without departing from the scope thereof, it is intended that all matter contained in the above description or shown in the accompanying drawing shall be interpreted as illustrative and not in a limiting sense.

What is claimed is:

1. In a vehicle of the type which includes a semi-elliptic rear spring, a spring shackle at the rear end thereof and a leaf spring structure rigidly connected at one end to the channel frame and having an eye at its end encircling the lower bolt of the shackle link; the combination therewith of a conduit from the channel frame along one of said spring elements to the shackle bolt at the end of the spring element, said conduit being mounted to flex with said spring, and means associated with the shackle for supplying part of the lubricant delivered thereto to the other bolt thereof.

2. In a vehicle of the type which includes a semi-elliptic rear spring, a spring shackle at the rear end thereof and a leaf spring structure rigidly connected at one end to the channel frame and having an eye at its end encircling the lower bolt of the shackle link; the combination therewith of a conduit extending along the channel frame spring element and flexing therewith, a fitting connecting said conduit to the eye encircling the shackle bolt at the end of the conduit; and means for feeding a portion of the lubricant from said shackle bolt upward to the other bearing bolt.

3. In a vehicle of the type which includes a lower semi-elliptic spring, a spring shackle with upper and lower bolts at the rear end of said lower spring, said lower spring having an eye encircling the upper bolt of said shackle, and an upper leaf spring rigidly connected at one end to the chassis frame and having an eye at its other end encircling the lower bolt of the shackle link; the combination therewith of means for lubricating the shackle from a point on the channel frame, said means comprising a length of flexible conduit, bridging from near said connected end of the upper leaf spring to one of said eyes, and means associated with the shackle link for supplying to one of the bolts of the shackle, a portion of the lubricant admitted to the other bolt.

4. In combination with a vehicle having a chassis frame, an axle, a downwardly sloping quarter elliptical elongated multi-leaf supporting spring located between said frame and said axle connected at its upper end to said frame, a tension shackle connected to the lower end of said spring, said shackle being provided with an upper bolt and a lower bolt, said spring being provided with an eye encircling said lower bolt, a second elongated half elliptical multi-leaf supporting spring provided with a spring eye encircling the upper bolt, and said shackle including links connected to and extending between said bolts and at the sides of said spring eyes; a lubricating installation comprising a curved flexible conduit extending downwardly substantially in the general direction of the first mentioned elongated spring from the frame to one of said bolts, said conduit having extra length to accommodate relative movements between the ends thereof, and being mounted to flex with flexure of said first mentioned spring and the upper portion of said conduit being mounted adjacent the upper part of said first mentioned spring, a fitting connected to the outlet end of said flexible conduit and serving as an inlet for lubricant to said one of said bolts, a well in the upper side of said one of said bolts receiving lubricant from said fitting and feeding lubricant directly to the bearing surface of said one of said bolts, longitudinal bores through each of said bolts, a conduit extending longitudinally of one of said links connecting said bores, said well feeding the bore in one of said bolts and said conduit receiving lubricant from said last mentioned bore and feeding to the other bore, whereby the other bolt will be lubricated.

5. In a vehicle of the type which includes a lower semi-elliptic rear spring, a spring shackle with upper and lower bolts at the rear end of said lower spring, said lower spring having an eye encircling the upper bolt of said shackle, and an upper leaf spring connected at one end to the chassis frame and having an eye at its other end encircling the lower bolt of the shackle link; the combination therewith of means for supplying lubricant to said shackle, said means comprising a flexible conduit extending along said upper leaf spring from adjacent said connected end to said shackle end from the channel frame and mounted to flex with said upper spring and delivering at the eye of said upper spring, said bolts being provided with bores extending therethrough and said shackle being provided with a connecting conduit between the bores of each bolt, said bores and conduit constituting a lubricating system to lubricate in series the lower and the upper bearings of the shackle.

6. In combination with a plurality of spaced bearings at different levels, a lubricating installation comprising means to feed the lower one of said bearings a quantity of lubricant in excess of its needs, said lubricant being fed into and across the bearing surface, a receiver to collect that part of the total lubricant fed to said bearings which is not fed into said bearing surface after it has flowed across said bearing surface and a wick device leading from said receiver to the other of said bearings.

GEORGE BIJUR,
*Executor of the Estate of Joseph Bijur, Deceased.*